US012737931B2

(12) United States Patent
Lin

(10) Patent No.: US 12,737,931 B2
(45) Date of Patent: Sep. 15, 2026

(54) IMMERSIVE CONTENT DISPLAYING METHOD, DISPLAY DEVICE AND NON-TRANSITORY COMPUTER READABLE STORAGE MEDIUM

(71) Applicant: HTC Corporation, Taoyuan City (TW)

(72) Inventor: Li-Wei Lin, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 301 days.

(21) Appl. No.: 18/352,229

(22) Filed: Jul. 13, 2023

(65) Prior Publication Data

US 2024/0212225 A1 Jun. 27, 2024

Related U.S. Application Data

(60) Provisional application No. 63/477,224, filed on Dec. 27, 2022.

(51) Int. Cl.
*G06T 7/70* (2017.01)
*G06T 7/20* (2017.01)
*G06T 11/00* (2006.01)

(52) U.S. Cl.
CPC ................ *G06T 11/00* (2013.01); *G06T 7/20* (2013.01)

(58) Field of Classification Search
CPC .................................... G06T 7/70; G06T 7/20
See application file for complete search history.

(56) References Cited

U.S. PATENT DOCUMENTS 10,714,055 B1 * 7/2020 Strasdat ................ G06F 3/0346
2016/0316110 A1 * 10/2016 Ross ...................... H04N 23/73
2017/0118400 A1 * 4/2017 Hesch .................. H04N 23/684
2018/0180712 A1 * 6/2018 Chen ......................... G01S 5/30
2019/0073786 A1 * 3/2019 Wen ........................ G06F 3/011
2019/0080467 A1 * 3/2019 Hirzer ........................ G06T 7/73
2019/0325274 A1 * 10/2019 Balan .................... G06F 3/0346
2019/0341007 A1 * 11/2019 Holland ................ G06F 3/1415
2021/0158546 A1 * 5/2021 He .......................... G01S 17/89
2021/0311601 A1 10/2021 Chandler et al.

FOREIGN PATENT DOCUMENTS

CN 112771884 A 5/2021
CN 115297351 A 11/2022
TW 201939951 A 10/2019

OTHER PUBLICATIONS

The office action of the corresponding Taiwanese application No. TW112145882 issued on Nov. 7, 2024.

* cited by examiner

*Primary Examiner* — Yi Yang
(74) *Attorney, Agent, or Firm* — CKC & Partners Co., LLC

(57) ABSTRACT

The present disclosure provides immersive content displaying method and display device. The display device includes front camera, processor and display panel. The immersive content displaying method includes: by the processor, obtaining first pose of the display device and second pose of the display device, wherein the first pose is corresponding to first timestamp at which the front camera captures frame image, and the second pose is corresponding to second timestamp at which the processor receives the frame image; by the processor, generating predicted movement of the display device after the second timestamp according to the first pose and the second pose; by the processor, processing partial area of the frame image according to the predicted movement, to generate base image; and by the display panel, displaying the base image to provide immersive content.

20 Claims, 4 Drawing Sheets

IMMERSIVE CONTENT DISPLAYING METHOD, DISPLAY DEVICE AND NON-TRANSITORY COMPUTER READABLE STORAGE MEDIUM

CROSS-REFERENCE TO RELATED APPLICATION

This application claims priority to U.S. Provisional Application Ser. No. 63/477,224, filed on Dec. 27, 2022, which is herein incorporated by reference.

BACKGROUND

Field of Invention

This disclosure relates to a method and device, and in particular to a immersive content displaying method and display device.

Description of Related Art

In the application of mixed reality (MR), one of the most important things is providing the user in the real world with a simulated real-world view in real time, which can be referred to as pass-through function. Most head-mounted devices use at least one front camera to implement the pass-through function. The field of view (FOV) of the front camera is normally larger than a designed FOV of lenses in the head-mounted device, which results in that a large area on the image captured by the front camera would not be seen by the user. However, the head-mounted device still costs lots of processing resources for processing the whole image captured by the front camera. Therefore, it is necessary to improve the related arts for implementing the pass-through function in better way.

SUMMARY

An aspect of present disclosure relates to an immersive content displaying method applicable to a display device, wherein the display device includes a front camera, a processor and a display panel, and the immersive content displaying method includes: by the processor, obtaining a first pose of the display device and a second pose of the display device, wherein the first pose is corresponding to a first timestamp at which the front camera captures a frame image, and the second pose is corresponding to a second timestamp at which the processor receives the frame image; by the processor, generating a predicted movement of the display device after the second timestamp according to the first pose and the second pose; by the processor, processing a partial area of the frame image according to the predicted movement, to generate a base image; and by the display panel, displaying the base image to provide an immersive content.

Another aspect of present disclosure relates to a display device. The display device includes a front camera, a processor and a display panel. The front camera is configured to capture a frame image. The processor is coupled to the front camera, is configured to obtain a first pose of the display device and a second pose of the display device, is configured to generate a predicted movement of the display device according to the first pose and the second pose, and is configured to process a partial area of the frame image according to the predicted movement, to generate a base image, wherein the first pose is corresponding to a first timestamp at which the front camera captures the frame image, and the second pose is corresponding to a second timestamp at which the processor receives the frame image. The display panel is coupled to the processor, and is configured to display the base image to provide an immersive content.

Another aspect of present disclosure relates to a non-transitory computer readable storage medium with a computer program to execute an immersive content displaying method applicable to a display device, wherein the display device includes a front camera, a processor and a display panel, and the immersive content displaying method includes: by the processor, obtaining a first pose of the display device and a second pose of the display device, wherein the first pose is corresponding to a first timestamp at which the front camera captures a frame image, and the second pose is corresponding to a second timestamp at which the processor receives the frame image; by the processor, generating a predicted movement of the display device after the second timestamp according to the first pose and the second pose; by the processor, processing a partial area of the frame image according to the predicted movement, to generate a base image; and by the display panel, displaying the base image to provide an immersive content.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

As used herein, "coupled" and "connected" May be used to indicate that two or more elements physical or electrical contact with each other directly or indirectly, and may also be used to indicate that two or more elements cooperate or interact with each other.

Figure 1:
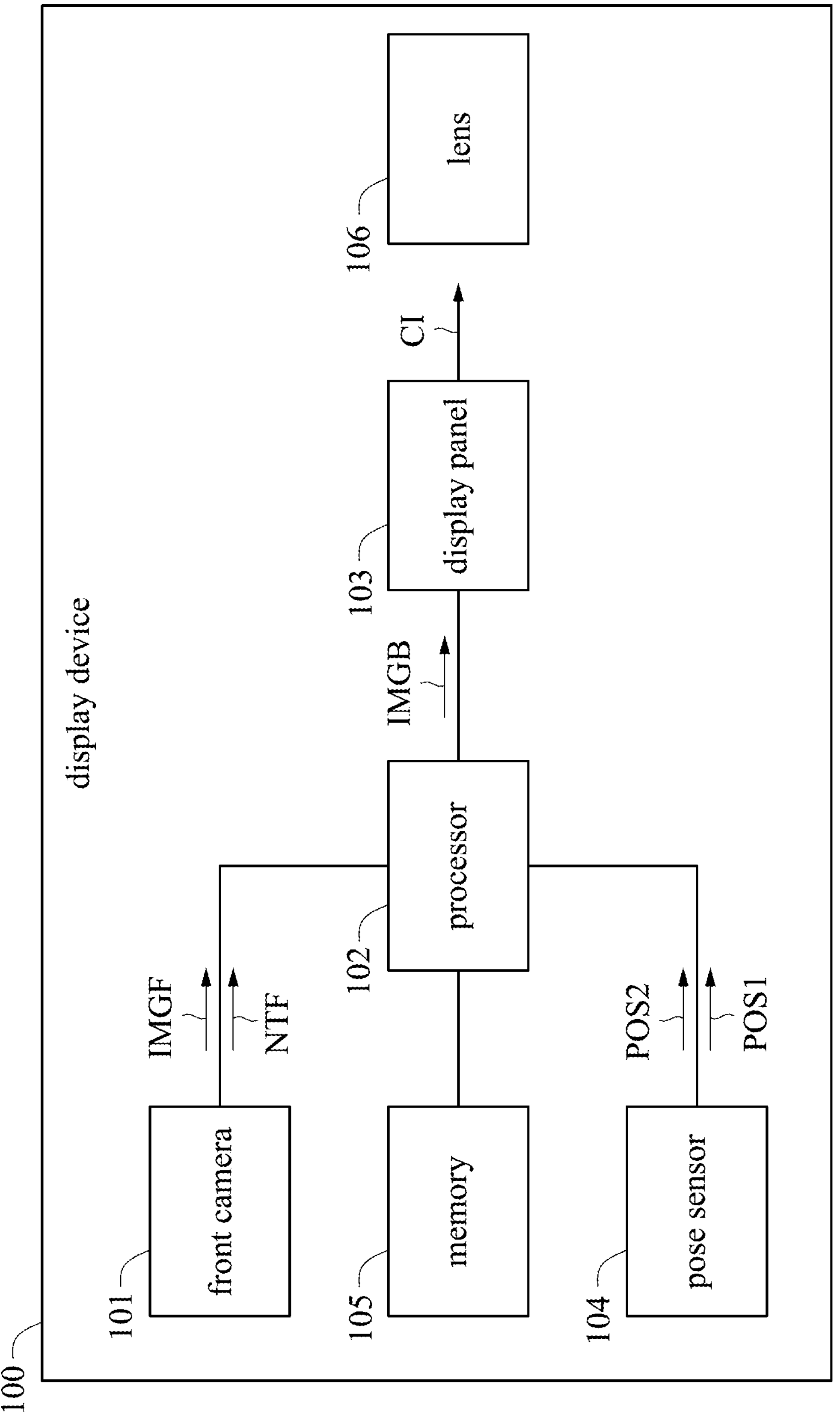
FIG. 1 is a block diagram of a display device in accordance with some embodiments of the present disclosure.

Referring to FIG. 1, FIG. 1 is a block diagram of a display device 100 in accordance with some embodiments of the present disclosure. In some embodiments, the display device 100 includes a front camera 101, a processor 102, a display panel 103, a pose sensor 104, a memory 105 and a lens 106. As shown in FIG. 1, the processor 102 is electrically coupled to the front camera 101, the display panel 103, the pose sensor 104 and the memory 105, and the lens 106 is arranged near the display panel 103 so that light emitted by the display panel 103 can transmit through the lens 106 to eyes of a user of the display device 100.

In some embodiments, the display device 100 is a wearable device. For example, the display device 100 is a head-mounted device (HMD). Thus, in some embodiments, the display device 100 is mounted on head of the user, and is operated by the user in a physical environment such as a room, a game site, etc. The display device 100 mounted on the head of the user occludes the direct visibility of the user to the physical environment, but the display device 100 can provide an immersive content CI for the user in exchange.

In some embodiments, the immersive content CI is a virtual reality (VR) environment, or a mixed reality (MR) environment which simulates the physical environment and enables an interaction of virtual reality objects (which cannot be directly seen in the physical environment by the user) with the simulated physical environment. However, the present disclosure is not limited herein. For example, in some embodiments, the immersive content CI is the simulated physical environment without the virtual reality objects, which is also known as a pass-through view.

Generally, the user's perception of space should change in response to a change in the user's movement. For example, when the user moves nearer to or away from multiple objects arranged on a plane, the user would aware that the number of the objects visible to him/herself is decreased or increased since his/her field of view (FOV) is fixed. In accordance with the embodiments that the immersive content CI is configured to simulate the physical environment, the display device 100 must responds to the change in the user's movement by adjusting the immersive content CI in real-time, so as to provide the immersive content CI which matches the perception that the user experiences in the physical environment.

In some embodiments, the display device 100 uses the front camera 101 to sense the physical environment, so as to provide the immersive content CI simulating the physical environment. It can be understood that the amount of the front camera 101 is not limited to one as illustrated in FIG. 1. For example, the amount of the front camera 101 can be two or other suitable number in some embodiments. As shown in FIG. 1, the front camera 101 is configured to capture at least one frame image IMGF of the physical environment. In order to provide the immersive content CI matching for the perception that the user should have in real-time, in some further embodiments, a FOV of the front camera 101 is broader than a designed FOV of the display device 100 provided to the user via the lens 106.

In some related arts, the whole frame image captured by the front camera is processed, but only part of the processed frame image is used for providing the immersive content to the user wearing the display device. As a demand for high image resolution and/or high image definition increases, the processing resources of the processor would be significantly occupied when the related arts processes the whole frame image captured by the front camera, which might have a negative effect on performance of the processor.

In some embodiments of the present disclosure, the front camera 101 is a high-pixel and color camera, so that the frame image IMGF captured by the front camera 101 is high-resolution (e.g., 2K, 4K, etc.) and color image. In view of above issues of the performance, in some embodiments, the processor 102 is configured to process only part of the frame image IMGF by predicting a movement of the display device 100 wore by the user, so as to generate a base image IMGB. In particular, a size of the base image IMGB is smaller than a size of the frame image IMGF.

In particular, the processor 102 can be implemented by central processing unit (CPU), graphic processing unit (GPU), application-specific integrated circuit (ASIC), microprocessor, system on a Chip (SoC) or other suitable processing units.

In some embodiments, the display panel 103 is configured to receive the base image IMGB from the processor 102, and is configured to display the base image IMGB. In some embodiments, when the display device 100 is mounted on the head of the user, the lens 106 is positioned between the display panel 103 and eyes of the user. In such arrangements, when the display panel 103 displays the base image IMGB, the user can view and perceive the immersive content CI by looking at visual content on the display panel 103 via the lens 106. In particular, the display panel 103 can be implemented by an active-matrix organic light-emitting diode (AMOLED) display, or the likes. It can be understood that the lens 106 of display device 100 can include two ocular lenses in some embodiments.

In some embodiments, the pose sensor 104 is configured to sense pose of the display device 100, in which the pose is changed with the movement of the display device 100. In particular, the pose sensor 104 can include tracking cameras, an inertial measurement unit (IMU), or the both. The tracking cameras can provide image data that is processed in the pose sensor 104, so that a three-dimensional (3D) translation data (e.g., three axial displacements, which are perpendicular to each other) corresponding to the movement of the display device 100 can be determined by the pose sensor 104 according to the image data by technologies such as, Simultaneous Localization and Mapping (SLAM), etc. The inertial measurement unit may be implemented by accelerometer, gyroscope, magnetometer, or other suitable sensors, and can provide motion data that is processed in the pose sensor 104, so that a 3D rotation data (e.g., pitch angle, roll angle, yaw angle, etc.) corresponding to the movement of the display device 100 can be determined by the pose sensor 104 according to the motion data. The 3D translation data and the 3D rotation data can be combined by the pose sensor 104 to generate the pose indicating six degrees of freedom (DOF) of the display device 100. Moreover, based on the pose sensed by the pose sensor 104, the display device 100 can update the visual content on the display panel 103 to provide the immersive content CI reflecting the movement of the display device 100.

In some embodiments, the memory 105 is configured to store signals, data and/or information required by the operation of the display device 100. For example, the memory 105 may store the pose sensed by the pose sensor 104 and/or the frame image IMGF captured by the front camera 101. In particular, the memory 105 can be implemented by a volatile memory unit, a non-volatile memory unit, or the both.

Figure 2:
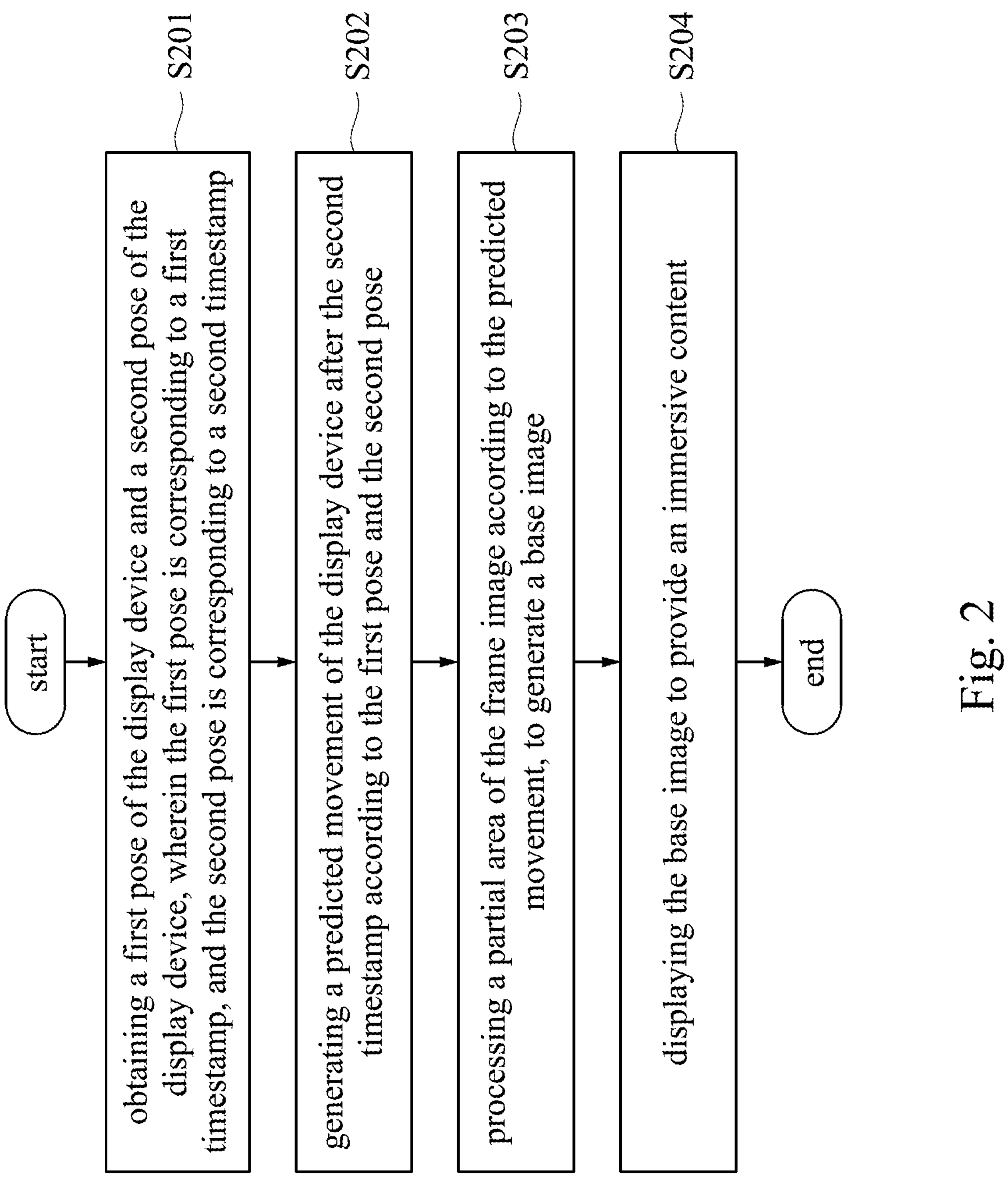
FIG. 2 is a flow diagram of an immersive content displaying method in accordance with some embodiments of the present disclosure.

The operation of the display device 100 would be described in detail with reference to FIG. 2. Referring to FIG. 2, FIG. 2 is a flow diagram of an immersive content displaying method 200 in accordance with some embodiments of the present disclosure. The immersive content displaying method 200 can be performed by the display device 100 of FIG. 1, but the present disclosure should not be limited herein. In some embodiments, as shown in FIG. 2, the immersive content displaying method 200 includes operations S201-S204.

In operation S201, the processor 102 obtains a first pose POS1 of the display device 100 and a second pose POS2 of the display device 100, which would be described in detail below.

In some embodiments, as shown in FIG. 1, the front camera 101 is configured to send a notification NTF to the processor 102, to notify the processor 102 that the front camera 101 captures a frame (e.g., the frame image IMGF). In other words, the notification NTF can indicate a capture of the frame image IMGF. When receiving the notification NTF from the front camera 101, the processor 102 requests the pose sensor 104 to sense current pose of the display device 100. The pose sensor 104 senses as soon as the processor 102 requests, to generate the first pose POS1.

Figure 3:
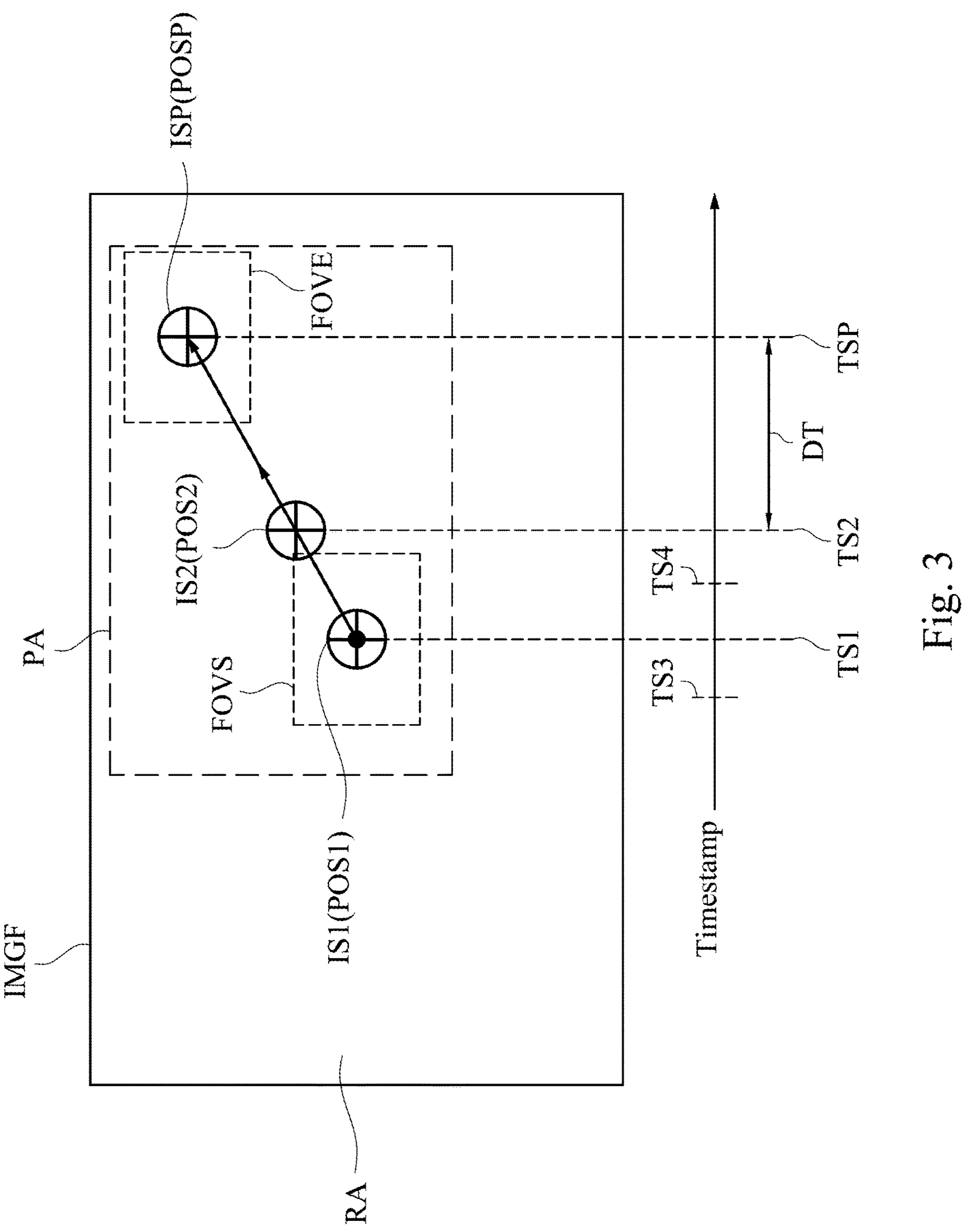
FIG. 3 is a schematic diagram of a determination of a to-be-processed area on a frame image according to a predicted movement of the display device in accordance with some embodiments of the present disclosure.

For the sake of clarity and convenience, following descriptions would be illustrated with reference to FIG. 3. FIG. 3 is a schematic diagram of a determination of a to-be-processed area on the frame image IMGF according to a predicted movement of the display device 100 in accordance with some embodiments of the present disclosure.

In some embodiments, the first pose POS1 indicates a first viewing direction (not shown) of the user wearing the display device 100. In particular, if an imaginary line (not shown) extends along the first viewing direction from a center of the user's eyes, the imaginary line would intersect with an imaginary plane defined by the frame image IMGF captured by the front camera 101 at an intersection point IS1 eventually. That is, the intersection point IS1 corresponds to the first pose POS1. In some embodiments, as shown in FIG. 3, the first pose POS1 is corresponding to a first timestamp TS1, in which the first timestamp TS1 can be generated by a timestamp counter (not shown) in the pose sensor 104 at a time point that the pose sensor 104 senses the first pose POS1. Because the first pose POS1 is requested when the front camera 101 captures the frame image IMGF, the first timestamp TS1 is also corresponding to a time point at which the front camera 101 captures the frame image IMGF. In addition, the pose sensor 104 sends the first pose POS1 together with the first timestamp TS1 back to the processor 102.

In accordance with the above embodiments, after the frame image IMGF is captured, the front camera 101 transfers the frame image IMGF to the processor 102. When receiving the frame image IMGF from the front camera 101, the processor 102 requests the pose sensor 104 again to sense the current pose of the display device 100, so that the pose sensor 104 generates the second pose POS2.

In particular, the second pose POS2 indicates a second viewing direction (not shown) of the user wearing the display device 100. Another imaginary line (not shown) extending along the second viewing direction from the center of the user's eyes would intersect with the imaginary plane defined by the frame image IMGF (which is captured at the first timestamp TS1) at another intersection point IS2 eventually. In some embodiments, the second pose POS2 corresponding to the intersection point IS2 in FIG. 3 is corresponding to a second timestamp TS2 after the first timestamp TS1. The second timestamp TS2 can be generated by the timestamp counter in the pose sensor 104 at a time point that the pose sensor 104 senses the second pose POS2. Because the second pose POS2 is requested when the processor 102 receives the frame image IMGF, the second timestamp TS2 is also corresponding to a time point at which the processor 102 receives the frame image IMGF. In addition, the pose sensor 104 sends the second pose POS2 together with the second timestamp TS2 back to the processor 102.

As can be seen from the above descriptions, in some embodiments, the processor 102 is configured to request the first pose POS1 corresponding to the first timestamp TS1 from the pose sensor 104 when receiving the notification NTF indicating the capture of the frame image IMGF from the front camera 101, and is configured to request the second pose POS2 corresponding to the second timestamp TS2 from the pose sensor 104 when receiving the frame image IMGF from the front camera 101. However, the way of obtaining the first pose POS1 and the second pose POS2 are not limited herein.

For example, in some embodiments, the memory 105 stores multiple poses of the display device 100 that the pose sensor 104 senses after the display device 100 is turned on. Each of the multiple poses stored in the memory 105 is generated at one of multiple time points at which the pose sensor 104 senses. When receiving the notification NTF indicating the capture of the frame image IMGF from the front camera 101, the processor 102 obtains the first timestamp TS1 by, for example, reading a timestamp counter (not shown) in the processor 102. When receiving the frame image IMGF from the front camera 101, the processor 102 obtains the second timestamp TS2 by reading the timestamp counter in the processor 102 again. Then, the processor 102 searches the memory 105 for the first pose POS1 and the second pose POS2 according to the first timestamp TS1 and the second timestamp TS2. In particular, the first timestamp TS1 represents a first time point, and the processor 102 finds the first pose POS1 generated at one of the multiple time points matching the first time point from the multiple poses stored in the memory 105. The second timestamp TS2 represents a second time point, and the processor 102 finds the second pose POS2 generated at one of the multiple time points matching the second time point from the multiple poses stored in the memory 105.

In operation S202, the processor 102 generates a predicted movement of the display device 100 after the second timestamp TS2 according to the first pose POS1 and the second pose POS2.

In some embodiments, as shown in FIG. 3, the predicted movement includes a predicted pose POSP of the display device 100, and the predicted pose POSP is corresponding to a predicted timestamp TSP after the second timestamp TS2 and is corresponding to an intersection point ISP in the imaginary plane defined by the frame image IMGF of FIG. 3. If the display device 100 generates the predicted pose POSP, it represents that the user wearing the display device 100 is predicted to have a predicted viewing direction correspondingly. Further, yet another imaginary line extending along the predicted viewing direction from the center of the user's eyes wearing the display device 100 would intersect with the imaginary plane defined by the frame image IMGF (which is captured at the first timestamp TS1) at the intersection point ISP eventually.

In order to generates the predicted pose POSP, in some embodiments, the processor 102 calculate a direction data recording the translation direction of the display device 100 changing from the first pose POS1 to the second pose POS2, and obtain a speed data of the display device 100 at the second timestamp TS2. In particular, the speed data can be calculated from sensing data of the accelerometer and/or the gyroscope included in the IMU, and can include linear speed, angular speed, or the both. Based on the speed data and the direction data, the processor 102 can deduce the predicted pose POSP from the second pose POS2. For example, the processor 102 can multiply the speed data by a time difference DT (as shown in FIG. 3) between the predicted timestamp TSP and the second timestamp TS2, so as to calculate a predicted 3D displacement. Thus, the processor 102 may generate the predicted pose POSP from the second pose POS2, the predicted 3D displacement and the direction data. For example, the second pose POS2 and the predicted pose POSP can be set respectively as a start and an end of a vector whose length and direction are respectively the predicted 3D displacement and the translation direction in the direction data.

In operation S203, the processor 102 processes a partial area PA of the frame image IMGF according to the predicted movement, to generate the base image IMGB.

In some embodiments, as shown in FIG. 3, the partial area PA, which has a size smaller than the size of the frame image IMGF, is defined by the processor 102 according to the predicted movement. In FIG. 3, the intersection point IS1 may reflect a start field of view FOVS of the user wearing the display device 100 having the first pose POS1, and the intersection point ISP may reflect an end field of view FOVE of the user wearing the display device 100 hypothetically having the predicted pose POSP. In particular, the processor 102 may set a rectangle area capable of accommodating both the start field of view FOVS and the end field of view FOVE as the partial area PA. As can be understood from these descriptions, the immersive content displaying method 200 further includes operations of defining the partial area PA of the frame image IMGF according to the predicted movement before operation S203 in some embodiments.

In accordance with the above embodiments, the processor 102 may further consider an intermediate field of view of the user wearing the display device 100 having the second pose POS2. In other words, in some further embodiments, the processor 102 may set a rectangle area capable of accommodating the start field of view FOVS, the intermediate field of view and the end field of view FOVE as the partial area PA.

In some embodiments, the processor 102 processes the partial area PA to generate the base image IMGB by performing a variety of corrections on the partial area PA.

For example, in some embodiments that the front camera 101 is implemented by camera having fish-eye lens, the processor 102 performs a distortion correction on the partial area PA to correct a fish-eye distortion. In some practical applications, a position at which the front camera 101 is arranged on the display device 100 may not always be ideal for aligning a viewing direction of the front camera 101 with the viewing direction of the user, which may cause that the pass-through view different from what is being seen from the user's point of view. Thus, in some embodiments, the processor 105 may perform a perspective correction on the partial area PA with reference to, for example, the tracking camera's point of view, so as to address above issues. In order to reasonably display the virtual reality objects in the simulated physical environment, in some embodiments, the processor 105 may perform a depth correction on the partial area PA. Moreover, in some embodiments, the processor 105 may perform a quality correction (e.g., adjustments to color, brightness, acutance, sharpness, contrast, resolution, etc.) on the partial area PA to enhance image detail in the partial area PA.

As can be seen from the above embodiments, the variety of corrections includes the distortion correction, the perspective correction, the depth correction, the quality correction, or a combination thereof.

In the above embodiments, as shown in FIG. 3, a remaining area RA on the frame image IMGF different from the partial area PA is not processed by the processor 102. That is, the processor 102 does not perform the variety of corrections on the remaining area RA. However, the present disclosure is not limited herein. In some further embodiment, the processor 102 crops the remaining area RA, blacks the remaining area RA, or removes image information in the remaining area RA.

In some embodiment, as shown in FIG. 1, the processor 102 transfers the base image IMGB to the display panel 103 after the base image IMGB is generated, and therefore operation S204 is performed. In operation S204, the display panel 103 displays the base image IMGB to provide the immersive content CI. The descriptions of operation S204 are similar to those of the embodiments of FIG. 1, and therefore are omitted herein.

In the above embodiments, the processor 102 uses the first pose POS1 corresponding to the first timestamp TS1 at which the front camera 101 captures the frame image IMGF and the second pose POS2 corresponding to the second timestamp TS2 at which the processor 102 receives the frame image IMGF, to predict pose of the display device 100 after the second timestamp TS2. However, the present disclosure is not limited herein.

For example, in some further embodiments, as shown in FIG. 3 again, the front camera 101 starts an exposure at a third timestamp TS3 before the first timestamp TS1, and completes the exposure at the first timestamp TS1, so as to generate the frame image IMGF. Also, the front camera 101 starts a transfer of the frame image IMGF to the processor 102 at a fourth timestamp TS4 before the second timestamp TS2, and completes the transfer of the frame image IMGF to the processor 102 at the second timestamp TS2, so that the processor 102 receive the frame image IMGF. In accordance with the above embodiments, the timestamp at which the front camera 101 captures the frame image IMGF can be anyone of the first timestamp TS1 (when the exposure is completed) and the third timestamp TS3 (when the exposure is started). Also, the timestamp at which the processor 102 receives the frame image IMGF can be anyone of the second timestamp TS2 (when the transfer is completed) and the fourth timestamp TS4 (when the transfer is started). There would be four different poses corresponding to the first timestamp TS1, the second timestamp TS2, the third timestamp TS3 and the fourth timestamp TS4, respectively. Accordingly, the processor 102 may select two poses from those four different poses to use to generate the predicted pose POSP of the display device 100 after the second timestamp TS2.

Figure 4:
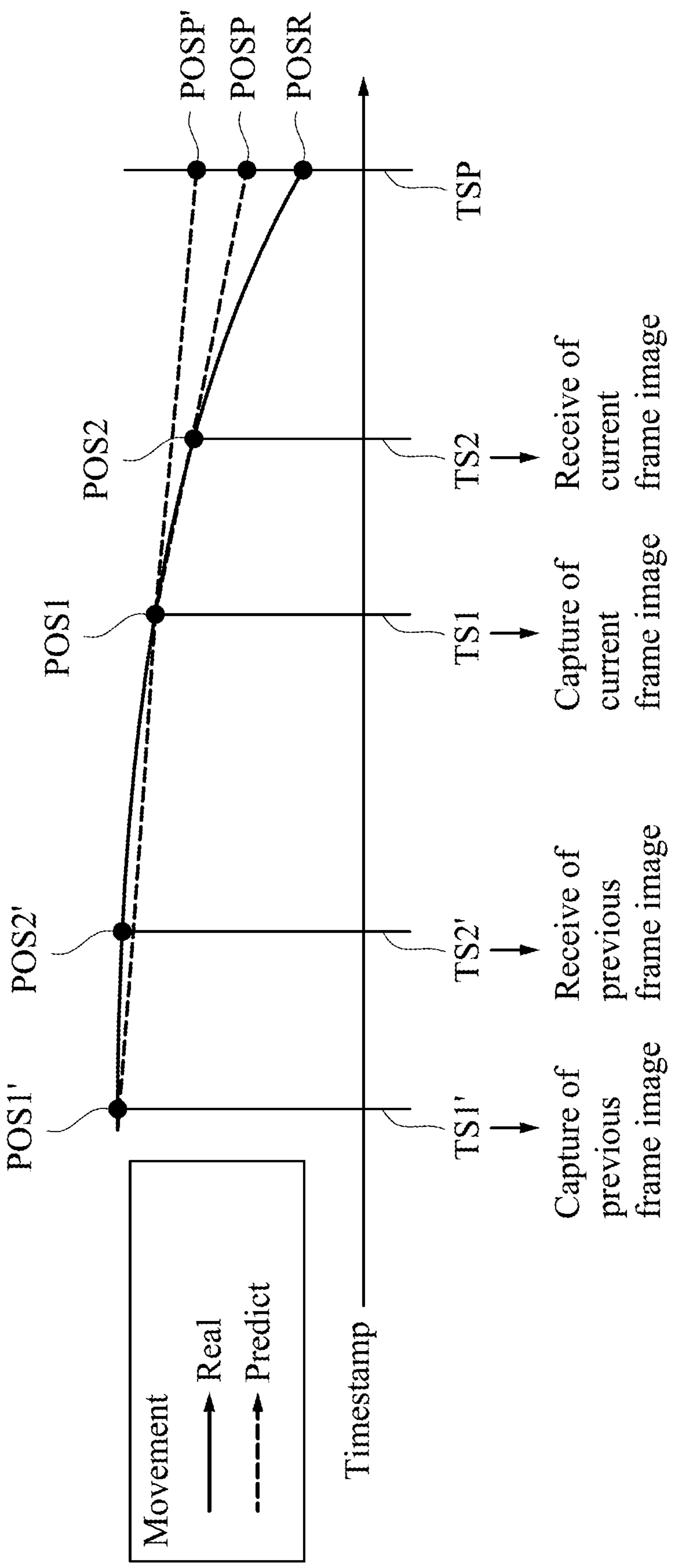
FIG. 4 is a schematic diagram of real movement and predicted movement of the display device in accordance with some embodiments of the present disclosure.

Referring to FIG. 4, FIG. 4 is a schematic diagram of real movement and predicted movement of the display device 100 in accordance with some embodiments of the present disclosure. FIG. 4 illustrates that a current frame image (i.e., the frame image IMGF) is captured at the first timestamp TS1 and is received, for example, by the processor 102, at the second timestamp TS2. As the descriptions of the above embodiments, the first pose POS1 corresponding to the first timestamp TS1 and the second pose POS2 corresponding to the second timestamp TS2 are obtained.

In some embodiments, as shown in FIG. 4, a previous frame image is captured at a timestamp TS1' and is received at a timestamp TS2' after the timestamp TS1', and a pose POS1' corresponding to the timestamp TS1' and a pose POS2' corresponding to the timestamp TS2' are obtained.

The descriptions of obtaining the pose POS1' and the pose POS2' are similar to those of the above embodiments, and therefore are omitted herein.

In some related arts, the pose POS1' and the first pose POS1 are used to predict pose of the display device 100 at the predicted timestamp TSP, in which the result of prediction is represented by a pose POSP'. In the present disclosure, the first pose POS1 and the second pose POS2 are used to predict pose of the display device 100 at the predicted timestamp TSP, in which the result of prediction is represented by the predicted pose POSP. As shown in FIG. 4, the predicted pose POSP is closer to a real pose POSR of the display device 100 that the pose sensor 104 actually senses at the predicted timestamp TSP than the pose POSP'. That is, in comparison to the prediction made by using two poses sensed in two frame periods respectively, the prediction made by using two poses sensed in one frame period achieves high accuracy.

As can be seen from the above embodiments of the present disclosure, by processing the partial area PA on the frame image IMGF according to the predicted movement of the display device 100, the display device 100 and the immersive content displaying method 200 of the present disclosure would not raise multiple issues such as, lots of the processing resources being occupied, etc. Therefore, the present disclosure has advantage of improved performance.

The disclosed methods, may take the form of a program code (i.e., executable instructions) embodied in tangible media, such as floppy diskettes, CD-ROMS, hard drives, or any other transitory or non-transitory machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. An immersive content displaying method applicable to a display device, wherein the display device comprises a front camera, a processor and a display panel, and the immersive content displaying method comprises:

by the processor, obtaining a first pose of the display device in response to the front camera capturing a frame image and obtaining a second pose of the display device in response to the processor receiving the frame image, wherein the first pose is corresponding to a first timestamp at which the front camera captures the frame image, and the second pose is corresponding to a second timestamp at which the processor receives the frame image;

by the processor, generating a predicted movement of the display device after the second timestamp according to the first pose and the second pose;

by the processor, processing a partial area of the frame image according to the predicted movement, to generate a base image; and by the display panel, displaying the base image to provide an immersive content.

2. The immersive content displaying method of claim 1, wherein obtaining the first pose and the second pose comprises:

by the processor, obtaining the first timestamp when receiving a notification indicating a capture of the frame image from the front camera;

by the processor, obtaining the second timestamp when receiving the frame image from the front camera; and by the processor, searching a memory of the display device for the first pose and the second pose according to the first timestamp and the second timestamp.

3. The immersive content displaying method of claim 1, wherein obtaining the first pose and the second pose comprises:

by the processor, requesting the first pose corresponding to the first timestamp from a pose sensor of the display device when receiving a notification indicating a capture of the frame image from the front camera; and by the processor, requesting the second pose corresponding to the second timestamp from the pose sensor when receiving the frame image from the front camera.

4. The immersive content displaying method of claim 1, wherein generating the predicted movement after the second timestamp according to the first pose and the second pose comprises:

by the processor, calculating a predicted pose of the display device based on a speed data of the display device at the second timestamp and a direction data calculated from the display device changing from the first pose to the second pose, wherein the predicted pose corresponding to a predicted timestamp after the second timestamp.

5. The immersive content displaying method of claim 1, further comprising:

by the front camera, starting an exposure at a third timestamp before the first timestamp; and by the front camera, completing the exposure at the first timestamp, so as to generate the frame image.

6. The immersive content displaying method of claim 5, further comprising:

by the front camera, starting a transfer of the frame image to the processor at a fourth timestamp before the second timestamp; and by the front camera, completing the transfer of the frame image to the processor at the second timestamp, so that the processor receive the frame image.

7. The immersive content displaying method of claim 1, further comprising:

by the processor, defining the partial area of the frame image according to the predicted movement.

8. The immersive content displaying method of claim 7, wherein the predicted movement comprises a predicted pose corresponding to a predicted timestamp after the second timestamp, and defining the partial area of the frame image according to the predicted movement comprises:

by the processor, setting a rectangle area capable of accommodating both a start field of view corresponding to the first pose and an end field of view corresponding to the predicted pose as the partial area.

9. The immersive content displaying method of claim 1, wherein processing the partial area of the frame image comprises:

by the processor, performing a distortion correction, a perspective correction, a depth correction, a quality correction, or a combination thereof on the partial area.

10. The immersive content displaying method of claim 1, further comprising:

by the processor, cropping or unprocessing a remaining area of the frame image different from the partial area.

11. A display device, comprising:

a front camera, configured to capture a frame image;

a processor, coupled to the front camera, configured to obtain a first pose of the display device in response to the front camera capturing the frame image and obtain a second pose of the display device in response to the processor receiving the frame image, configured to generate a predicted movement of the display device according to the first pose and the second pose, and configured to process a partial area of the frame image according to the predicted movement, to generate a base image, wherein the first pose is corresponding to a first timestamp at which the front camera captures the frame image, and the second pose is corresponding to a second timestamp at which the processor receives the frame image; and a display panel, coupled to the processor, and configured to display the base image to provide an immersive content.

12. The display device of claim 11, further comprising a memory coupled to the processor, and configured to store a plurality of poses of the display device;

wherein the processor is configured to obtain the first timestamp when receiving a notification indicating a capture of the frame image from the front camera, is configured to obtain the second timestamp when receiving the frame image from the front camera, and is configured to search the memory for the first pose and the second pose according to the first timestamp and the second timestamp.

13. The display device of claim 11, further comprising a pose sensor coupled to the processor, and configured to sense a pose of the display device;

wherein the processor is configured to request the first pose corresponding to the first timestamp from the pose sensor when receiving a notification indicating a capture of the frame image from the front camera, and is configured to request the second pose corresponding to the second timestamp from the pose sensor when receiving the frame image from the front camera.

14. The display device of claim 11, wherein the processor is configured to calculate a predicted pose of the display device based on a speed data of the display device at the second timestamp and a direction data calculated from the display device changing from the first pose to the second pose, wherein the predicted pose corresponding to a predicted timestamp after the second timestamp.

15. The display device of claim 11, wherein the front camera is configured to start an exposure at a third timestamp before the first timestamp, and is configured to complete the exposure at the first timestamp, so as to generate the frame image.

16. The display device of claim 15, wherein the front camera is configured to start a transfer of the frame image to the processor at a fourth timestamp before the second timestamp, and is configured to complete the transfer of the frame image to the processor at the second timestamp, so that the processor receive the frame image.

17. The display device of claim 11, wherein the processor is configured to define the partial area of the frame image according to the predicted movement.

18. The display device of claim 17, wherein the predicted movement comprises a predicted pose corresponding to a predicted timestamp after the second timestamp;

wherein the processor is configured to set a rectangle area capable of accommodating both a start field of view corresponding to the first pose and an end field of view corresponding to the predicted pose as the partial area.

19. The display device of claim 11, wherein the processor is configured to perform a distortion correction, a perspective correction, a depth correction, a quality correction, or a combination thereof on the partial area.

20. A non-transitory computer readable storage medium with a computer program to execute an immersive content displaying method applicable to a display device, wherein the display device comprises a front camera, a processor and a display panel, and the immersive content displaying method comprises:

by the processor, obtaining a first pose of the display device in response to the front camera capturing a frame image and obtaining a second pose of the display device in response to the processor receiving the frame image, wherein the first pose is corresponding to a first timestamp at which the front camera captures the frame image, and the second pose is corresponding to a second timestamp at which the processor receives the frame image;

by the processor, generating a predicted movement of the display device after the second timestamp according to the first pose and the second pose;

by the processor, processing a partial area of the frame image according to the predicted movement, to generate a base image; and by the display panel, displaying the base image to provide an immersive content.

* * * * *